United States Patent
Schlarb et al.

(10) Patent No.: US 8,938,645 B2
(45) Date of Patent: Jan. 20, 2015

(54) INVALIDATION OF METADATA BUFFERS

(71) Applicants: Uwe Schlarb, Walldorf (DE); Stefan Baeuerle, Walldorf (DE)

(72) Inventors: Uwe Schlarb, Walldorf (DE); Stefan Baeuerle, Walldorf (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 13/623,059

(22) Filed: Sep. 19, 2012

(65) Prior Publication Data

US 2014/0082415 A1   Mar. 20, 2014

(51) Int. Cl.
*G06F 11/00*   (2006.01)

(52) U.S. Cl.
USPC ................... 714/20; 714/21; 714/54

(58) Field of Classification Search
CPC ............ G06F 11/1435; G06F 11/1448; G06F 11/1471
USPC ................ 714/20, 21, 54
See application file for complete search history.

(56) References Cited

U.S. PATENT DOCUMENTS

| | | | |
|---|---|---|---|
| 7,139,927 B2 * | 11/2006 | Park et al. | 714/4.1 |
| 7,412,496 B2 * | 8/2008 | Fridella et al. | 709/219 |
| 7,653,836 B1 * | 1/2010 | Chatterjee et al. | 714/20 |
| 8,346,729 B2 * | 1/2013 | Brannon et al. | 707/661 |
| 8,452,929 B2 * | 5/2013 | Bennett | 711/162 |
| 2007/0220328 A1 * | 9/2007 | Liu et al. | 714/24 |
| 2007/0271306 A1 * | 11/2007 | Brown et al. | 707/200 |
| 2008/0162590 A1 * | 7/2008 | Kundu et al. | 707/202 |
| 2009/0313503 A1 * | 12/2009 | Atluri et al. | 714/19 |
| 2014/0101378 A1 * | 4/2014 | Olbrich et al. | 711/103 |

\* cited by examiner

*Primary Examiner* — Marc Duncan
(74) *Attorney, Agent, or Firm* — Mintz Levin Cohn Ferris Glovsky and Popeo, P.C.

(57) ABSTRACT

A quick buffer validity check can optionally be performed when a potential invalidity of the content of a buffer is identified. The identifying of the potential invalidity condition can include determining that a most recent lifecycle management event timestamp is more recent than a most recent buffer validity check timestamp for the buffer. To determine whether the buffer contents need to be refreshed, a list of the last changed timestamps for the constituent elements of the buffer can be compared to a new list. If the new list and the old list are not identical, the buffer can be rebuilt.

19 Claims, 7 Drawing Sheets

INVALIDATION OF METADATA BUFFERS

TECHNICAL FIELD

The subject matter described herein relates to buffers and the like for retaining rapid access to metadata.

BACKGROUND

In software architectures, design time metadata are typically retained in a buffer, a load, a cache, or the like, which can include a rapidly accessible (e.g. local, high speed) storage medium to allow a fast access to these metadata. For the purposes of this disclosure, such rapid access system features are collectively referred to as a buffer. In general, a buffer is advantageously kept in sync with the original metadata that are replicated in the buffer when changes are applied to the original metadata. This need to maintain synchronization between the original metadata, which are typically retained in long term storage, such as for example magnetic hard disks, solid state data storage devices, optical data storage devices, or the like, and the metadata replicated in the buffer can be relevant not only when the metadata objects themselves are changed but also when extensions to such metadata objects are created, modified, switched on or off, or the like.

Some illustrative aspects of buffer operation can be understood by reference to an example in which business object metadata are stored in a metadata repository or another type of data persistency that stores metadata used by a software application, such as for example a business software architecture (e.g. an enterprise resource planning program or the like). In this context, a business object can be or include one or more of a broad category of business processes that are modeled as objects. A business object can be as large as an entire order processing system or a small process within an information system. Metadata can include structural metadata, which can define the design and specification of data structures.

SUMMARY

Aspects of the current subject matter can include identifying an indication that content of a buffer might be invalid. As used herein, a buffer stores a buffered version of each of one or more constituent elements copied from an original version of the constituent element retained in a repository. The identification can be made at least in part by determining that a most recent buffer validity check timestamp for the buffer is not later than a most recent lifecycle management event timestamp associated with a lifecycle management event. A new list of last changed timestamps that includes a last changed time stamp for each of the one or more constituent elements can be compared with a list existing prior to a lifecycle management event. If the new list differs from the prior list, the buffer can be rebuilt.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Metadata associated with business objects can define features, characteristics, etc. of functionality supported or provided by instances of the business object. For example, metadata of a sales order business object can describe one or more of nodes (e.g. "Header," "Item', etc.), aspects (e.g. appearance, fields on one or more of the nodes, functions, etc.), and the like that are reflected in an instance of a sales order. This information can be spread among multiple database tables and can be shipped as a transport object (e.g. a collection of tables which constitute logical business entities). During runtime, a fast access to these metadata can be provided by putting them in a readable form into shared memory (e.g. main system memory or the like), for example as one or more data objects, tables, or the like.

Various objects in an enterprise resource planning program or other business software architecture can be retained in a buffer such as is described above. For example, one or more of business object metadata, an application server programming language such as Java or ABAP, a data dictionary such as an ABAP dictionary, mapping information mapping one or more controller objects to one or more business objects, one or more backend service adaptation models (BSA), mapping information mapping one or more message types from a service interface operation to a business object (e.g. in a maintain bundle framework or MBF), field extensibility metadata describing the mapping of one or more extension fields, search-related metadata for fast search infrastructure (FSI) and for use in supporting FSI views and queries, and the like can be retained in such a buffer.

While the specific name applied to a buffer in a given system can differ, their operation generally has various features in common. Transported metadata are converted in one or more ways into a suitable format for the runtime and are then kept in the main memory or some other rapidly accessible storage medium that is part of or readily accessible by an application server. The buffer then retains these metadata that are replicated from a long term or otherwise slower access storage medium (e.g. a magnetic hard drive or the like). The replicated metadata are desirably kept consistent with the original metadata from which they are created.

Figure 1:
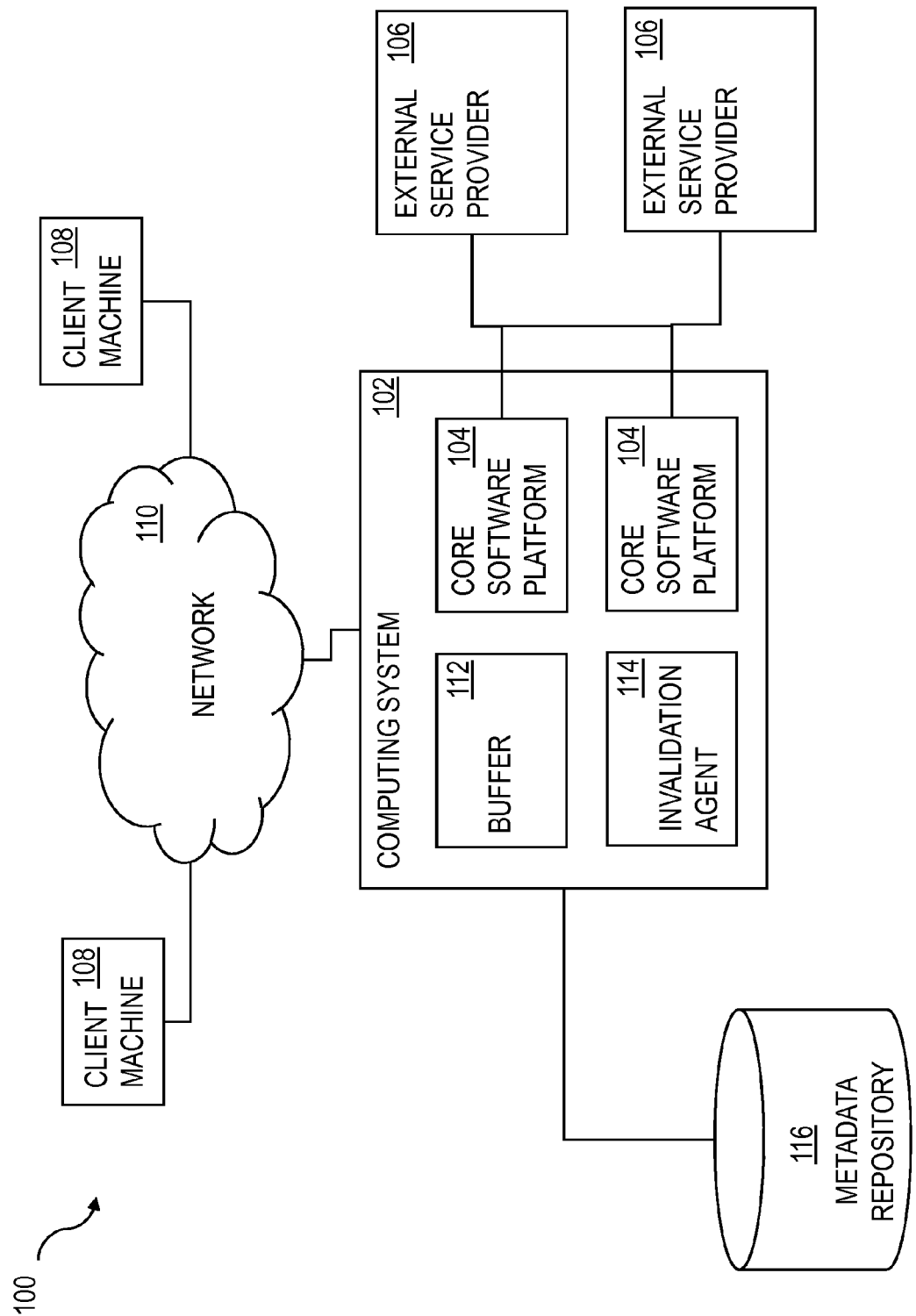
FIG. 1 is a diagram illustrating aspects of an example of a software architecture showing features consistent with implementations of the current subject matter.

The core software platform of an enterprise resource planning (ERP) system, other business software architecture, or other database functionality can in some implementations be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram of a system consistent with such an implementation. A computing system 102 can include one or more core software platform modules 104 providing one or more features of the business software system. In some implementations, the computing system 102 can be an application server. The computing system 102 can also aggregate or otherwise provide a gateway via which users can access functionality provided by one or more external service providers 106. Examples of external service providers 106 can include one or more computing systems supporting database functionality or other software functionality created or provided from a partner or other third party software developer. This external service provider database functionality or other software functionality can be provided over either direct or networked connections if the one or more external provider computing systems are separate from the computing system 102 that includes one or more core software platform modules 104. Alternatively, the external service provider database functionality or other software functionality can be hosted on the computing system 102 that includes the one or more core software platfonn modules 104.

Client machines 108 can access the computing system, either via a direct connection, a local terminal, or over a network 110 (e.g. a local area network, a wide area network, a wireless network, the Internet, or the like). The computing system 102 can include or otherwise be provided with fast access over a direct or networked connection to a buffer 112 that can retain, in a rapidly accessible storage medium or persistency, metadata for use by at least one of the one or more core software platform modules 104 and the database functionality or other software functionality provided by one or more external service providers 106. A buffer invalidation agent 114 or multiple agents can execute on the computing system 102, on one or more separate systems, or any combination thereof to perform one or more of the buffer invalidation operations discussed in greater detail below.

The metadata retained within the buffer 112 can be provided from one or more metadata repositories 116 that can store objects or other elements, such as for example business objects, metadata objects, or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. Metadata consistent with other definitions can also be stored in a persistent manner in the metadata repository 116 and replicated as needed to the buffer 112 for more rapid run time access of these metadata. In some implementations, a business object or other metadata object can include a template definition of a standard business process or other related functionality. The template definition can optionally be modified via one or more extensions that can also be stored in the one or more metadata repositories 116.

Smaller organizations can also benefit from use of business software functionality. However, such organizations may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 2:
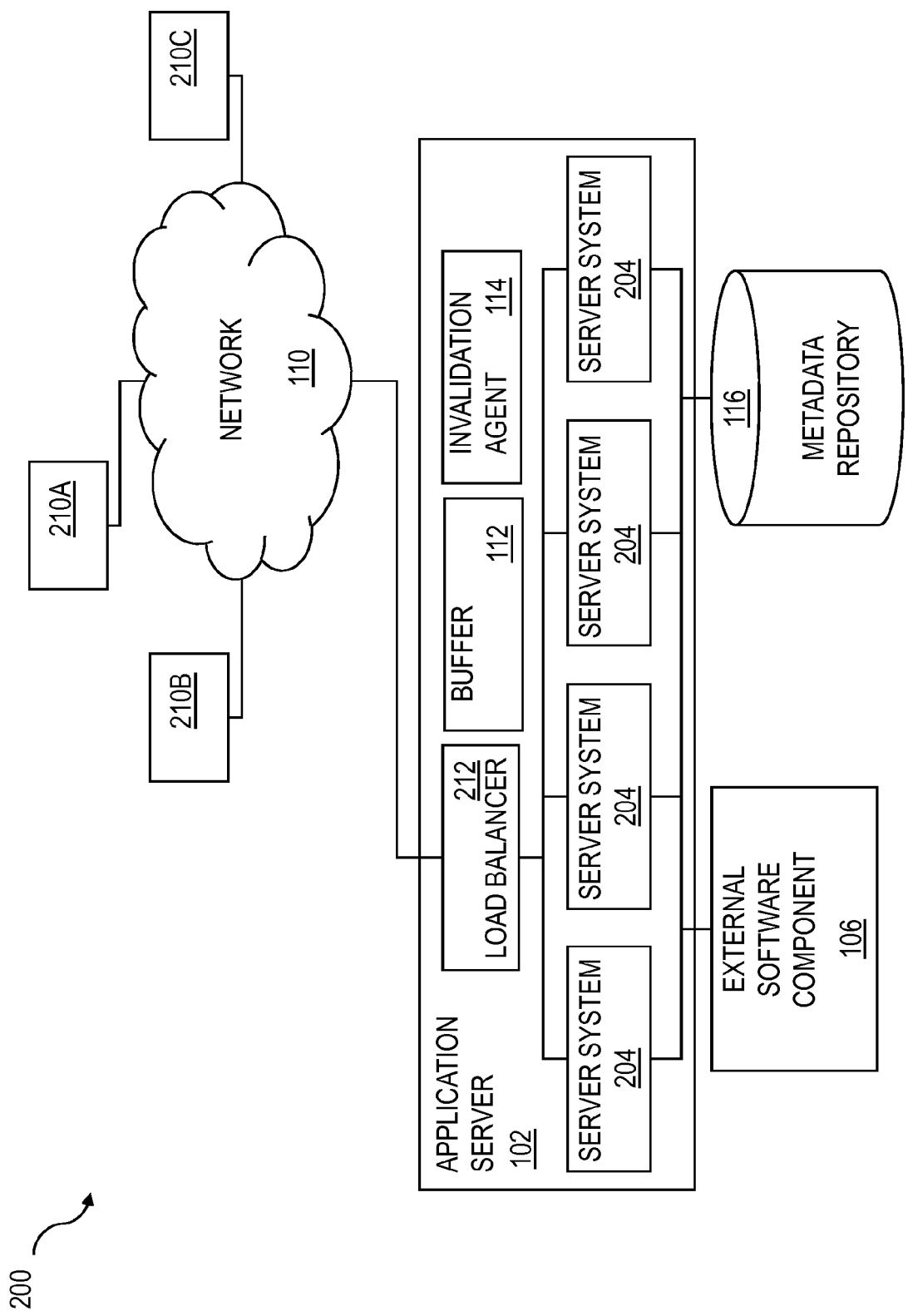
FIG. 2 is a diagram illustrating aspects of another example of a software architecture showing features consistent with implementations of the current subject matter.

FIG. 2 shows a block diagram of a multi-tenant implementation of a software delivery architecture 200 that includes an application server 202, which can in some implementations include multiple server systems 204 that are accessible over a network 206 from client machines operated by users at each of multiple organizations 210A-210C (referred to herein as "tenants" of a multi-tenant system) supported by a single software delivery architecture 200. For a system in which the application server 202 includes multiple server systems 204, the application server can include a load balancer 212 to distribute requests and actions from users at the one or more organizations 210A-210C to the one or more server systems 204. Instances of the core software platform 104 (not shown in FIG. 2) can be executed in a distributed manner across the server systems 204. A user can access the software delivery architecture across the network using a thin client, such as for example a web browser or the like, or other portal software running on a client machine. The application server 202 can access data and data objects stored in one or more data repositories 116 and can include or have access to a buffer 112 that retains, in a rapidly accessibly storage medium or persistency, metadata, metadata objects (e.g. business objects and the like), etc. for use by at least one of the one or more core software platform modules 104 and the database functionality or other software functionality provided by one or more external service providers 106. The application server 202 can also serve as a middleware component via which access is provided to one or more external software components 106 that can be provided by third party developers. A buffer invalidation agent 114 can perform one or more operations as discussed in greater detail below.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 202 that includes multiple server systems 204 that handle processing loads distributed by a load balancer 212. Potential benefits from such an arrangement can include, but are not limited to, high and reliably continuous application server availability and minimization of unplanned downtime, phased updating of the multiple server systems 204 to permit continuous availability (one server system 204 can be taken offline while the other systems continue to provide services via the load balancer 212), scalability via addition or removal of a server system 204 that is accessed via the load balancer 212, and de-coupled lifecycle management events or processes (such as for example system maintenance, software upgrades, etc.) that enable updating of the core software independently of tenant-specific customizations implemented by individual tenants.

As in the example illustrated in FIG. 1, the metadata repository 116 can store a business object that represents a template definition of a standard business process. Each individual tenant 210A-210C can customize that standard template according to the individual business process features specific to business of the organization to which that tenant is assigned. Customizations can be stored as extensions in the metadata repository.

Figure 3:
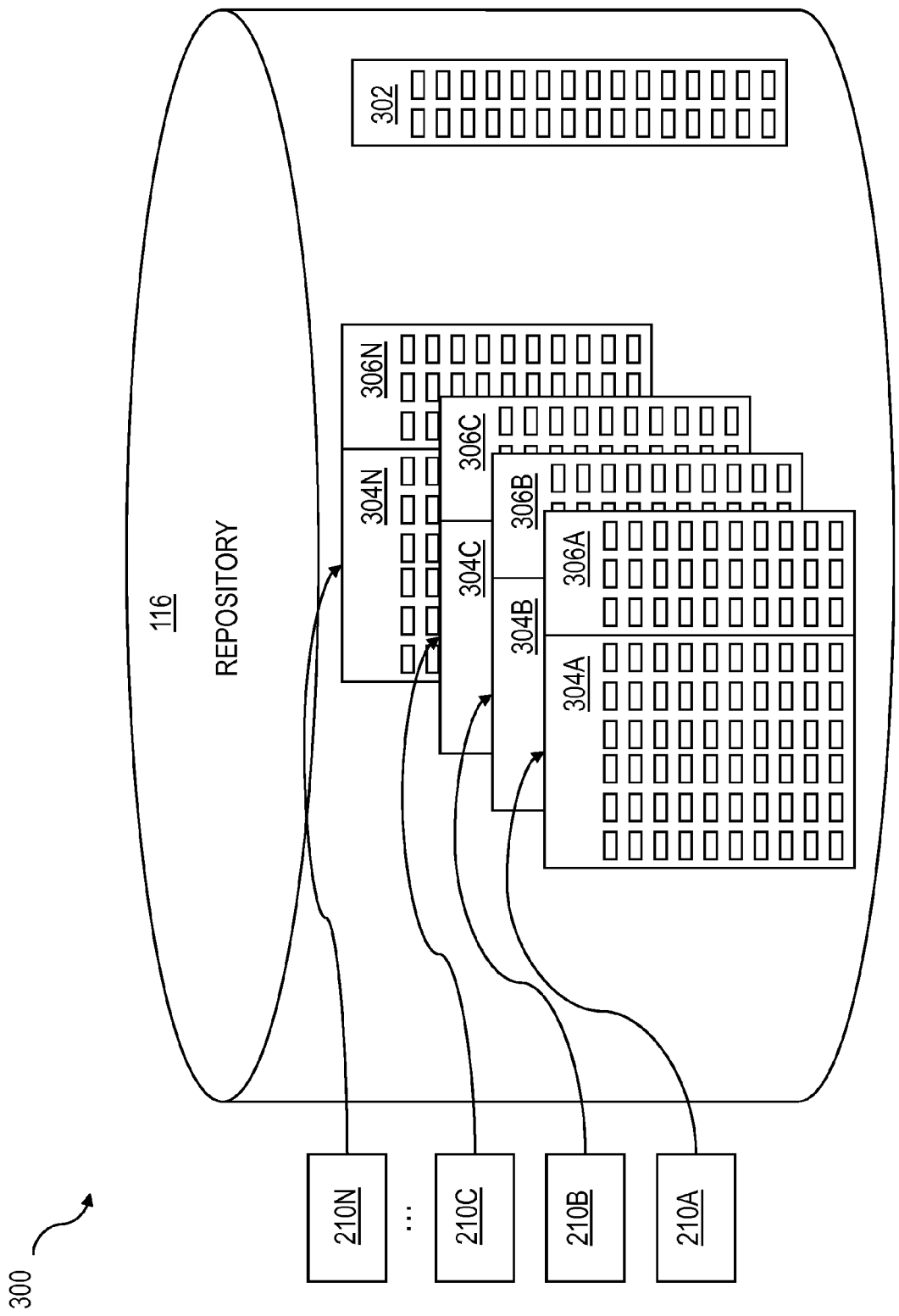
FIG. 3 is a diagram illustrating aspects of a repository showing features consistent with implementations of the current subject matter.

To provide for customization of the business process for each of multiple organizations supported by a single software delivery architecture 200, the data and data objects stored in the metadata repository 116 and/or other data repositories that are accessed by the application server 202 can include three types of content as shown in FIG. 3: core software platform content 302 (e.g. a standard definition of a business process), system content 304, and tenant content 306. Core software platform content 302 includes content that represents core functionality and is not modifiable by a tenant. System content 304 can in some examples be created by the runtime of the core software platform and can include core data objects that store concrete data associated with specific instances of a given business process and that are modifiable with data provided by each tenant. Metadata relating to one or more of core software platform content 302, system content 304, and content provided by the one or more external service providers 106 can optionally be part of a system tenant that is accessible from all other tenants 210A-210N.

The data and/or the metadata retained in the tenant content 306 can be tenant-specific: for example, each tenant 210A-210N can store information about its own inventory, sales orders, etc. as well as metadata pertaining to extensions, processes, or the like that are specific to the organization assigned to that tenant. Tenant content 306A-306N can therefore include data objects or extensions to other data objects that are customized for one specific tenant 210A-210N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 306 can reflect tenant-specific modifications or changes to a standard template definition of a business process as well as tenant-specific customizations of the business objects that relate to one or more individual process steps (e.g. records in generated condition tables, access sequences, price calculation results, other tenant-specific values, or the like). A combination of the software platform content 302 and system content 304 and tenant content 306 of a specific tenant are accessed to provide the business process definition and/or the status information relating to a specific instance of the business process according to customizations and business data of that tenant such that each tenant is provided access to a customized solution whose data are available only to users from that tenant.

One or more lifecycle management events or processes of an application server 102 can cause invalidation of the metadata retained in a buffer 112. A lifecycle management event in this context can refer to one or more of an import, an upgrade, a hot fix, or the like of one or more business objects or other data objects into a core software platform module 104 of a business software architecture or the database functionality or other software functionality provided by one or more external service providers 106. In the example of a multi-tenant approach such as described above in reference to FIG. 2 and FIG. 3, lifecycle management events affecting features of one or more core software platform modules 104 or of database functionality or other software functionality provided by one or more external service providers 106 can be performed in the system tenant. Similarly, other lifecycle management events that affect multiple tenants (e.g. scalable add-ons that can be active in multiple tenants) can also be performed on the system tenant. Lifecycle management events that affect only one tenant, for example upgrading, importing, hot fixing, etc. of an add-on or other custom feature that is used by only a single customer of the business software architecture; switching on or off a scalable add-on functionality for a single tenant; creating or modifying an extension to core software platform content 302, system content 304, or database functionality or other software functionality provided by one or more external service providers 106; or the like can be implemented only in the affected tenant.

A conventional buffer invalidation strategy can include a process that runs in association with a lifecycle management event. For example, metadata in a buffer that are affected by the lifecycle management event can be detected or otherwise identified using a where-used list such that the metadata are invalidated or even rebuilt. In this context, a where-used list can include a dictionary or other listing or index that identifies which objects or other data structures reference or otherwise have a dependency on a given object or other data structure.

However, such an approach can present one or more challenges. For example, in some lifecycle management events, the logic that must be executed during the lifecycle management event can be quite complex. This challenge can be particularly acute in multi-tenant systems in which tenants can be customized to meet the needs of different organizations, for example through extensions or the like.

The process of identifying metadata to be invalidated can become fragile (e.g. unstable or the like) for one or more reasons, potentially including but not limited to the difficulty of testing the process for all of the potential lifecycle management events that may occur in a complex business software architecture. For example, potential lifecycle management events can include one or more of an upgrade (e.g. to one or more of a core software platform, one or more externals service providers, or the like), a shadow upgrade (e.g. copying of a first system to a second, shadow system that is upgraded, updated, or otherwise altered before productive use is migrated from the active system to the shadow system), an import, a hot fix, a deployment of database functionality or other software functionality provided by one or more external service providers 106, extension field creation, switching on or off a solution, copying or moving to a different system of a tenant in a multi-tenant system, or the like. The boundary constraints for buffer invalidation can vary or otherwise be not very reliable in the various lifecycle management events, for example if it is not clear whether a where-used list is already created during a shadow upgrade when affected buffer content needs to be invalidated.

Moreover, for example in the case of a system supporting a fast search infrastructure (FSI), the identification of which constituent elements or objects in a buffer are to be invalidated can become very complex due to the involvement of many different objects. For example, one or more data types can refer to each other across different levels (e.g. up to 5 or more levels) of a complicated database management system architecture. Business objects or other data structures can include cross-level dependencies or otherwise be associated with each other across these different levels. In some implementations, multiple FSI views or the like can include cross-references and inter-dependencies across even more levels of a database management system architecture. This interdependency and inherent complexity in a full-featured system with multiple layers that can be developed, customized, or the like by one or more of multiple parties (e.g. the core software platform developer, a partner developer, a consultant who customizes one or more data structures to the needs of a customer organization, a key user at a customer organization who adds extensions, or the like) can significantly complicate the task of identifying what content held in a buffer 112 has become outdated and thus requires invalidation.

Implementations of the current subject matter can provide an improved approach to keeping buffers up to date. An approach consistent with one or more of such implementations can be more robust and easier to implement than existing approaches. Consistent with one or more of such implementations, a buffer validity check can be performed according to one or more algorithms, such as for example those described below, to check the validity of a buffer in a manner that does not require reading the content of all the constituents of the buffer. The check can also take into account static and client dependent extensions. Optionally, the buffer validity check need only be executed when a lifecycle management event has actually occurred, which can allow realization of additional performance gains in an equilibrated system (e.g. a system that has not recently undergone a lifecycle management event).

In an implementation, a buffer validity check can include one or more of the following features. As noted above, the constituent metadata elements or objects retained in a buffer 112 can include, but are not limited to business objects or other data objects or structures, proxy data types, FSI views, FSI queries, BSA models, MBF models, and the like. Such constituent metadata elements or objects can be delivered to the buffer via one or more transport objects, each of which can include a transaction timestamp that is indicative of the last time it was changed.

Figure 4:
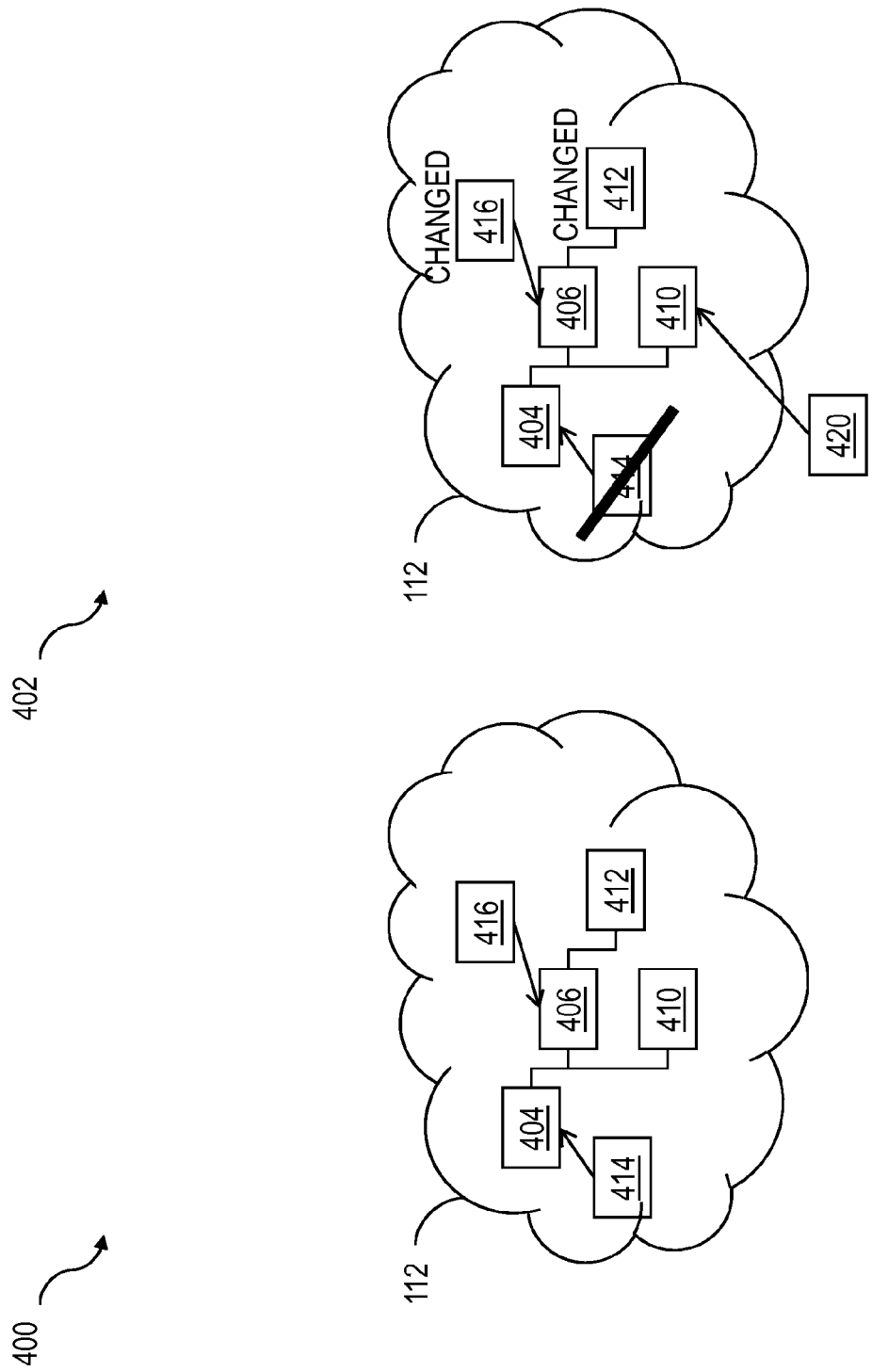
FIG. 4A and FIG. 4B illustrate features relating to changes, deletions, updates, or the like that occur to constituent elements of a buffer as a result of a lifecycle management event.

FIG. 4A and FIG. 4B show two diagrams 400 and 402, respectively illustrating how a buffer 112 is rebuilt when constituent elements are added or deleted. In the first diagram 400 illustrating the buffer 112 at a first point in time, the buffer 112 includes constituent elements: a first object 404, a second object 406, a third object 410, and a fourth object 412 that include various interdependencies. Also included as constituents in the buffer 112 are a first extension 414 that extends or otherwise adds features of functionality to the first object 404 and a second extension 416 that extends or otherwise adds features or functionality to the second object 406. A change of any of the existing constituent elements (in this example, a deletion or modification of any of the first object 404, the second object 406, the third object 410, the fourth object 412, or the first or second extensions 414, 416) or an addition of a new constituent element can cause the buffer 112 to require a rebuild. For example, as shown in FIG. 4B, any of a deletion or deactivation of the first extension 414, creation of a new extension 420, and changes to either of the second extension 414 and the fourth object 412 can require a rebuild of the buffer 112 and/or an index associated with the buffer 112.

Figure 5:
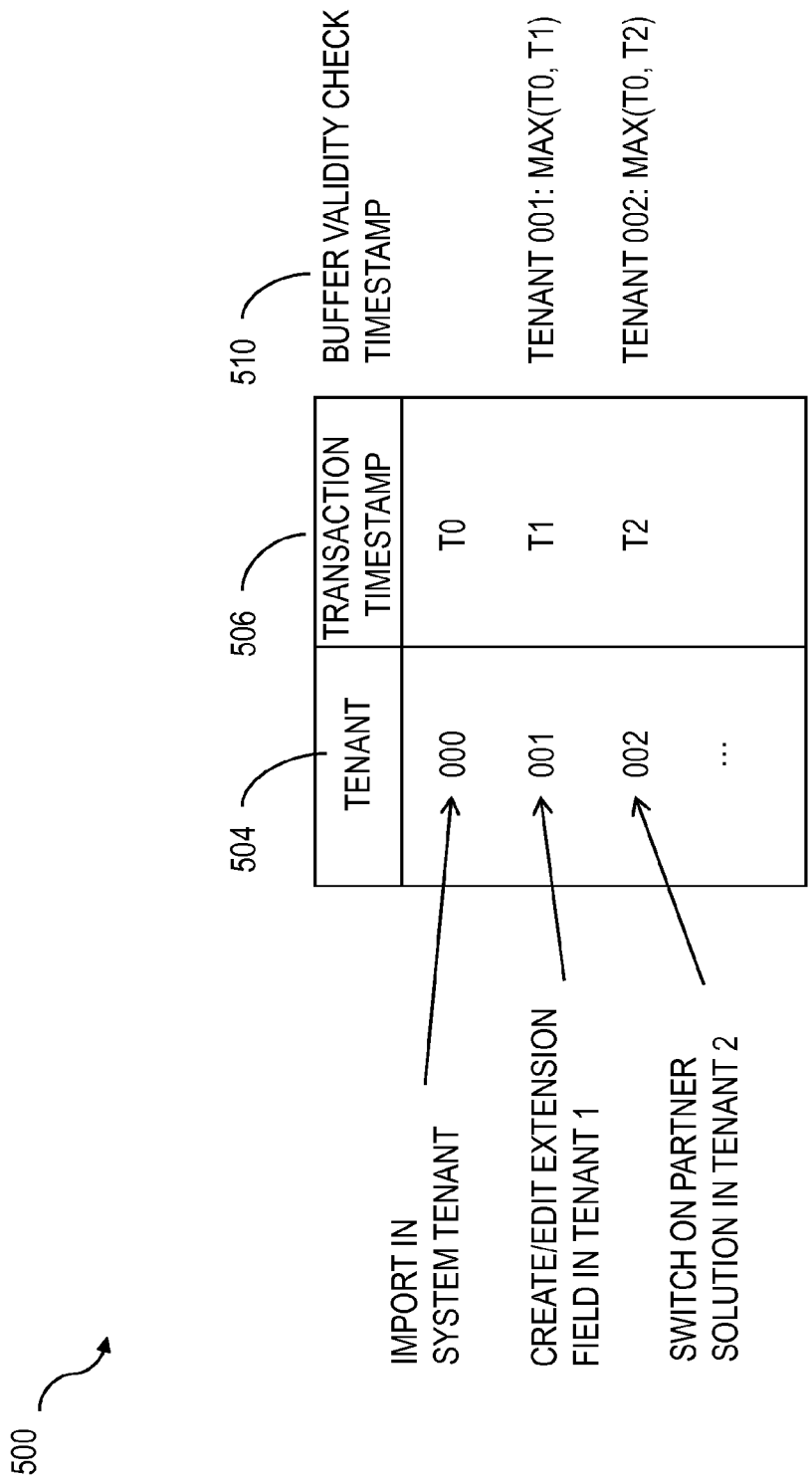
FIG. 5 shows an example of a lifecycle management event table consistent with implementations of the current subject matter.

FIG. 5 shows a lifecycle management event table 500 illustrating features consistent with implementations of the current subject matter as applied to an example of a multiple tenant architecture such as is discussed above in reference to FIG. 2 and FIG. 3. Each tenant of multiple tenants in the system can be assigned to a customer organization (e.g. an organization making use of a core software platform provided by a core software platform provider). A lifecycle management event table 500 can be maintained to track constituent elements present in a buffer 112 of the system and to record the tenants affected by each lifecycle management event and the transaction timestamps associated with the additions, deletions, or modifications of these constituent elements due to each lifecycle management event. As shown in FIG. 5, a lifecycle management event table 500 can include a record for each lifecycle management event. Each record can reflect a first field 504 storing an identification of one or more tenants affected by the lifecycle management event of each record and a second field 506 storing a transaction timestamp associated with the lifecycle management event.

When a lifecycle management event occurs, an entry can be made in a lifecycle management event table 500 regarding which constituent elements (for example transport objects) are present in the buffer 112 and which transaction timestamps the constituent elements present in the buffer 112 had when the buffer 112 was created. In general, a buffer 112 can require rebuilding as a result of one or more lifecycle management events, which can include without limitation a change to a constituent element of the buffer 112, removal or addition of a constituent of the buffer 112 (e.g. as can occur when a constituent element is deleted or created, a constituent element is switched on or off, or the like), etc.

As noted above, a buffer validity check consistent with implementations of the current subject matter need not read any content data of the constituent elements or objects retained in the buffer 112, but can instead let solely on information present in a buffer record table 500 and in the header timestamps of the constituent elements or objects retained in the buffer. During a buffer validity check operation, a buffer validity check timestamp of the constituent elements or objects retained in the buffer 112 are read from the lifecycle management event table 500 to determine whether a change has occurred. The existence of a specific constituent element or object retained in the buffer 112 can be checked to verify whether the constituent element or object has been deleted from the buffer 112 as part of the lifecycle management event. Extensions can be examined to determine whether a constituent element has been added. Switch framework information can be read to determine whether an extension has been switched on or off.

A buffer validity check consistent with implementations of the current subject matter can be significantly faster than rebuilding the buffer content and comparing it with the current buffer. However, despite this speed increase, such a check may not be fast enough to be executed during runtime each and every time the buffer 112, because data (e.g. the timestamps) are directly read from the database. Accordingly, a buffer validity check can optionally be completed only when a lifecycle management event has taken place.

A buffer check algorithm consistent with one or more implementations of the current subject matter need not rely on a clock synchronization of the source systems of the constituent elements of the buffer 112. Rather, the buffer validity check timestamp can be used merely as an indicator that something has changed. Thus, the buffer validity check timestamps optionally need not include information regarding "greater than" and "less than," but can instead simply include a record of a time at which a change occurred. In other words, no comparison of a transaction timestamp 506 is required with other transaction timestamps 506. Rather, a simple operation is completed to determine a most recent transaction timestamp 506 affecting a given logical entity that has associated constituent elements in the buffer 112. This most recent transaction timestamp 506 is retained in a specific instance of a buffer 112 as a buffer validity check timestamp 510. A globally unique identifier (GUID), hash value, or the like can optionally be created after each change of a transport object or other constituent element of the buffer 112. While a "greater than" or "less than" analysis of transaction timestamps 506 is not required, such an analysis can optionally be performed in a closed system in which all transaction timestamps 506 are available for inter-comparison. Such an inter-comparison can in some cases lead to a speed increase by allowing pre-processing of results.

Detection that a lifecycle management event has occurred can optionally be accomplished in a manner that can be understood with further reference to the lifecycle management event table 500 of FIG. 5. In a tenant (for example of a multi-tenant architecture) in which a lifecycle management event takes place, a timestamp can be updated in a client-specific lifecycle management table 500 (which can optionally be fully buffered). This operation can be performed for each of several lifecycle management events (for example an upgrade, a shadow upgrade, an import, a hotfix, a partner deployment, an extension field creation, a switching on or off a solution, a tenant copy, a tenant move, or the like) via a call to a static method. As used herein, a static method can refer to a method or operation that requires no input parameters. At runtime in a specific tenant, an actual timestamp can be calculated. In a customer system in which client isolation is taken into account, the calculation of the buffer validity check timestamp 510 can take the form of a determination of the most recent timestamp of the system tenant and the specific tenant: $MAX(TIME_{system\ tenant}, TIME_{current\ tenant})$. A system tenant can be a tenant of the multi-tenant system in which one or more features of the core software platform or other features that are common to all tenants supported on a single application server 102 are executed, stored, etc. A lifecycle management event in another tenant (e.g. an extension field creation, switching of a partner solution) can be ignored. However, a lifecycle management event in the system tenant that affect all tenants, for example an import, a hotfix, or the like, or in the specific tenant are taken into account. For each lifecycle management event that affects a given tenant, the most recent transaction timestamp is recorded in the lifecycle management event table 500 as a buffer validity check timestamp for that tenant. As shown in FIG. 5, the buffer validity check timestamp 510 for Tenant 2 does not reflect the timestamp associated with Tenant 1. However, the calculation of the buffer validity check timestamp 510 for each of Tenant 1 and Tenant 2 takes into account any timestamps associated with the system tenant (T0).

Figure 6:
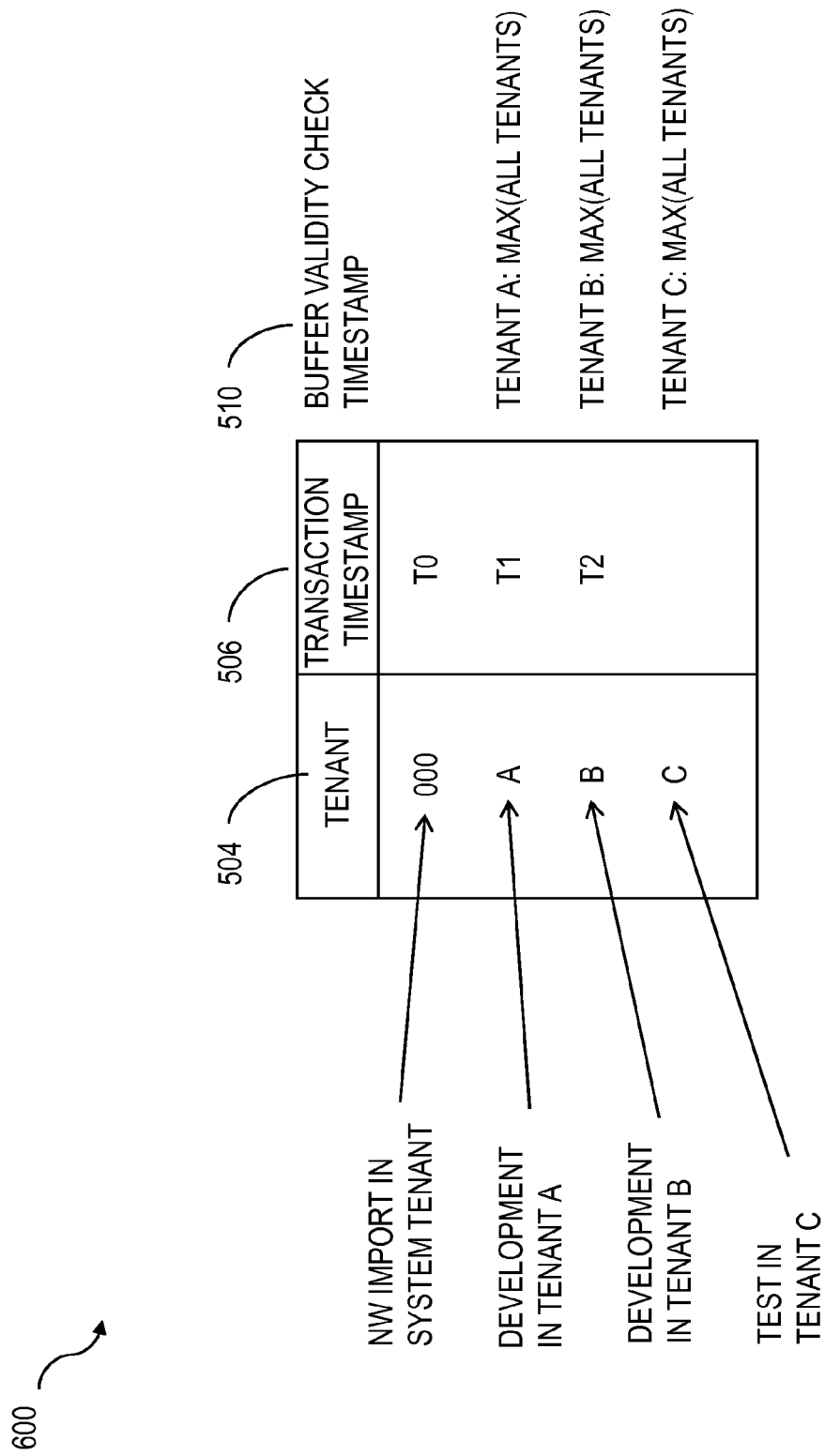
FIG. 6 shows another example of a lifecycle management event table consistent with implementations of the current subject matter.

FIG. 6 shows another example of a lifecycle management event table 600 that can be used in association with tracking of lifecycle management events of an internal development systems where tenant isolation is not necessarily maintained. In this example, a lifecycle management event affecting any tenant is reflected in the buffer validity check timestamp 510 of any other tenant. In other words, the calculation of the buffer validity check timestamp 510 for each of Tenants A, B, and C reflects the most recent transaction timestamp 506, for example mathematically represented as MAX(all clients), for all of the other tenants.

The calculated the buffer validity check timestamp 510 can be stored for each buffer 112 in a database system, software architecture, etc. (generically referred to as a database system). At each access at runtime this buffer validity check timestamp 510 can be compared to a transaction timestamp 506 for a most recent lifecycle management event. When the transaction timestamp 506 for the recent lifecycle management event is newer than the buffer validity check timestamp, it is known that a lifecycle management event has taken place and that at least some part of the buffer 112 is potentially invalid. The buffer 112 can then be checked using a quick buffer check algorithm as explained below. When this quick buffer check returns an invalid buffer the buffer content must be rebuilt.

In some cases a lifecycle management event may not be processed during downtime of a database system. Examples of where this situation can occur include adding an extension field (for example to a standard business object to implement custom functionality or the like), one-off deployments of a software or database fix or feature, switching on or off functionality associated with a solution provided by an external service provider or partner, or the like. In these situations, an "in process" flag can be set at the beginning of the lifecycle management event (e.g. at the beginning of the field extensibility generation) and a new transaction timestamp can be set at the completion of the non-downtime lifecycle management event. While the non-downtime lifecycle management event is in process, an application programming interface (API) associated with the affected functionality can return the current transaction timestamp such that all buffer loads are checked (and rebuilt if necessary) while the non-downtime lifecycle management event is running.

The timestamp of a specific constituent of the one or more constituent elements of a buffer 112 can be derived in a source system where or at which the specific constituent is created, changed, or the like. The timestamp of the specific constituent can be stored in the database table of the respective transport object. As an example, a data type (e.g. "DATATYPE1") for a business model can be changed in a development system (for example a development system on which developers at a vendor of a core software platform work on upgrades, new versions, etc.) on a first date and time. When this data type is transported into another system (e.g. a customer system), the information regarding the date and time of the change in the development system can, consistent with implementations of the current subject matter, remain available because the timestamp of the last change of the data type is transported with the data type, even between systems. A specific instance of a buffer 112 can store a list of timestamps of all of the constituents in that instance of the buffer 112.

A buffer 112 can optionally include a model (e.g. buffered metadata) of the business object with a "last changed" time stamp. For example, an example business object "Sales Order" can include the following constituents: a business object model of the "Sales Order" business object, a first data type "Sales Order Root Elements" and a second data type "Sales Order Item Elements." The specific instance of the buffer can store a list of time stamps indicating a last changed time, date, etc. for each of the one or more constituent elements stored in the buffer 112. In this example, such a list can include a last changed timestamp of Mar. 22, 2011 for the business object model of the "Sales Order" business object, a last changed timestamp of Apr. 1, 2011 for the first data type "Sales Order Root Elements", and a last changed timestamp of Mar. 13, 2011 for the second data type "Sales Order Item Elements."

Continuing with the above example, the deployment in a customer system of a newest release of the core software platform occurs on Jan. 10, 2012. In a specific tenant on the customer system, an extension field was created on Feb. 1, 2012. Accordingly, the last life cycle event for that specific tenant occurred on Feb. 1, 2012. When the buffered metadata for the business object "Sales Order" are created, the buffer validity time stamp is recorded as Feb. 1, 2012 and stored in the buffer 112. On Mar. 15, 2012, a developer makes a change to the first data type "Sales Order Root Elements" in a hotfix development system, and this hotfix is deployed in the customer system on Mar. 20, 2012. The time stamp for the last life cycle event in the tenant is therefore Mar. 20, 2012.

At runtime, the validity of the metadata retained in the buffer 112 can be checked consistent with implementations of the current subject matter. First, an indication that the content of the buffer 112 (e.g. the one or more constituent elements in the buffer 112) may be invalid is identified. In some implementations of the current subject matter, this identifying can include comparing a previous buffer validity timestamp (in this example, Feb. 1, 2012) to the last lifecycle management event timestamp (in this example, Mar. 20, 2012). If the last lifecycle management event timestamp is more recent than the previous buffer validity timestamp (as is the case in this example), this indicates that contents of the buffer 112 maybe invalid. To ascertain the validity of the buffer 112, a quick buffer check can be performed.

Figure 7:
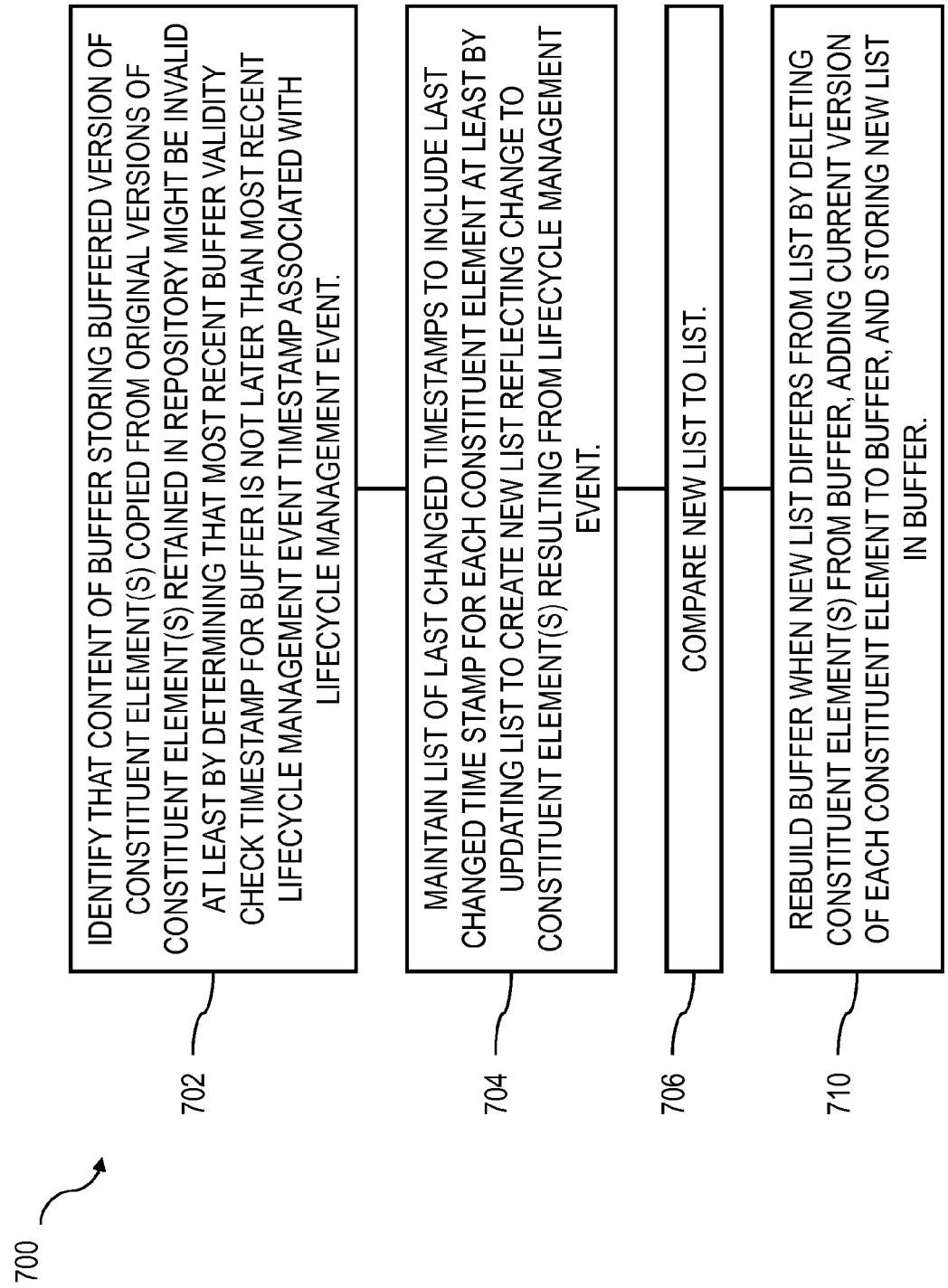
FIG. 7 is a process flow diagram illustrating aspects of a method having one or more features consistent with implementations of the current subject matter.

A quick buffer check consistent with implementations of the current subject matter can proceed as illustrated in the process flow chart 700 of FIG. 7. At 702, the identification discussed above is made regarding content of the buffer possibly being invalid. In short, a determination is made whether the most recent buffer validity check timestamp, which is stored in the buffer 112, is more or less recent than a most recent lifecycle management event timestamp. If the most recent lifecycle management event timestamp is more recent, it is determined that the content of the buffer might be invalid. Also as discussed above, the content of the buffer includes a buffered version of each of the one or more constituent elements copied from an original version of the constituent element retained in a repository.

A list of last changed timestamps is maintained at 704. The list includes a last changed time stamp for each of the one or more constituent elements. The maintaining includes updating the list to create a new list reflecting a change to at least one of the one or more constituent elements resulting from the lifecycle management event. In the current example, the new list of the one or more constituent elements of the buffer includes a new last changed time stamp of Mar. 15, 2012 for the first data type first data type "Sales Order Root Elements" because the first data type was modified as part of the deployment of the hot fix. At 706, the new list is compared to the list and, when the new list differs from the list, at 710 the buffer 112 is rebuilt. The rebuilding of the buffer includes deleting the one or more constituent elements from the buffer, adding a current version of each of the one or more constituent elements to the buffer, and storing the new list in the buffer.

The identifying that the buffer might be invalid can optionally be performed at runtime. Additionally, because the original most recent buffer validity check timestamp can be replaced in the buffer by a new most recent buffer validity check timestamp reflecting the time when the comparing of the new list and the old list occurred, a subsequent runtime access to the buffer will identify that the buffer is up to date simply by determining that the new most recent buffer validity check timestamp is more recent than a most recent lifecycle management event timestamp. The maintaining of the buffer can optionally include reading the last changed time stamp for a specific constituent element from a transport object that delivers the specific constituent element.

Implementations of the current subject matter can provide one or more advantages. For example, it can be difficult to use existing invalidation processes when a buffer is complicated, for example when a business object or the like is a set of other business objects or if there are complex dependencies between business objects and/or other data structures in the database system. Implementations of the current subject matter can avoid such issues by simplifying the buffer validity check process. Rather than requiring that all data be read from scratch for a buffer validity check, which can be time consuming and an inefficient use of memory and/or processor resources, a runtime-optimized buffer validity check timestamp format can be created from original metadata and kept in a cache, a shared memory, system memory, RAM, etc., for example as part of a lifecycle management event table 500. The approaches described herein include details relating to metadata buffers, for example as part of a database system. However, implementations of the current subject matter can be applied for all kinds of buffers. For example, approaches consistent with implementations of the current subject matter can be used in association with metadata buffers for a variety of transport objects, and can assist in providing flexibility for customers and partners, field extensibility, and the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above.

In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:

identifying that content of a buffer might be invalid, the buffer storing a buffered version of each of one or more constituent elements copied from original versions of the one or more constituent elements retained in a repository, the identifying comprising determining that a most recent buffer validity check timestamp for the buffer is not later than a most recent lifecycle management event timestamp associated with a lifecycle management event;

maintaining a list of last changed timestamps, the list comprising a last changed time stamp for each of the one or more constituent elements, the maintaining comprising updating the list to create a new list reflecting a change to at least one of the one or more constituent elements resulting from the lifecycle management event;

comparing the new list to the list; and rebuilding the buffer when the new list differs from the list, the rebuilding of the buffer comprising deleting the one or more constituent elements from the buffer, adding a current version of each of the one or more constituent elements to the buffer, and storing the new list in the buffer.

2. A computer program product as in claim 1, wherein the maintaining further comprises reading the last changed time stamp for a specific constituent element from a transport object that delivers the specific constituent element.

3. A computer program product as in claim 1, wherein the rebuilding further comprises storing a new most recent buffer validity check timestamp in the buffer to replace the most recent buffer validity check timestamp, the new most recent buffer validity check timestamp reflecting a time when the comparing occurs.

4. A computer program product as in claim 1, wherein the rebuilding further comprises accessing the original version of the constituent element stored in the repository.

5. A computer program product as in claim 1, wherein the identifying occurs at runtime.

6. A computer program product as in claim 5, wherein the operations further comprise identifying, on a subsequent runtime access of the buffer, that the buffer is up to date, the identifying that the buffer is up to date comprising determining that the new most recent buffer validity check timestamp is more recent than the most recent lifecycle management event timestamp for the buffer.

7. A system comprising:
    at least one programmable processor; and
    a machine-readable medium storing instructions that, when executed by the at least one processor, cause the at least one programmable processor to perform operations comprising:
    identifying that content of a buffer might be invalid, the buffer storing a buffered version of each of one or more constituent elements copied from original versions of the one or more constituent elements retained in a repository, the identifying comprising determining that a most recent buffer validity check timestamp for the buffer is not later than a most recent lifecycle management event timestamp associated with a lifecycle management event;

maintaining a list of last changed timestamps, the list comprising a last changed time stamp for each of the one or more constituent elements, the maintaining comprising updating the list to create a new list reflecting a change to at least one of the one or more constituent elements resulting from the lifecycle management event;

comparing the new list to the list; and rebuilding the buffer when the new list differs from the list, the rebuilding of the buffer comprising deleting the one or more constituent elements from the buffer, adding a current version of each of the one or more constituent elements to the buffer, and storing the new list in the buffer.

8. A system as in claim 7, wherein the maintaining further comprises reading the last changed time stamp for a specific constituent element from a transport object that delivers the specific constituent element.

9. A system as in claim 7, wherein the rebuilding further comprises storing a new most recent buffer validity check timestamp in the buffer to replace the most recent buffer validity check timestamp, the new most recent buffer validity check timestamp reflecting a time when the comparing occurs.

10. A system as in claim 7, wherein the rebuilding further comprises accessing the original version of the constituent element stored in the repository.

11. A system as in claim 7, wherein the identifying occurs at runtime.

12. A system as in claim 11, wherein the operations further comprise identifying, on a subsequent runtime access of the buffer, that the buffer is up to date, the identifying that the buffer is up to date comprising determining that the new most recent buffer validity check timestamp is more recent than the most recent lifecycle management event timestamp for the buffer.

13. A computer-implemented method comprising:

identifying that content of a buffer might be invalid, the buffer storing a buffered version of each of one or more constituent elements copied from original versions of the one or more constituent elements retained in a repository, the identifying comprising determining that a most recent buffer validity check timestamp for the buffer is not later than a most recent lifecycle management event timestamp associated with a lifecycle management event;

maintaining a list of last changed timestamps, the list comprising a last changed time stamp for each of the one or more constituent elements, the maintaining comprising updating the list to create a new list reflecting a change to at least one of the one or more constituent elements resulting from the lifecycle management event;

comparing the new list to the list; and rebuilding the buffer when the new list differs from the list, the rebuilding of the buffer comprising deleting the one or more constituent elements from the buffer, adding a current version of each of the one or more constituent elements to the buffer, and storing the new list in the buffer.

14. A computer-implemented method as in claim 13, wherein the maintaining further comprises reading the last changed time stamp for a specific constituent element from a transport object that delivers the specific constituent element.

15. A computer-implemented method as in claim 13, wherein the rebuilding further comprises storing a new most recent buffer validity check timestamp in the buffer to replace the most recent buffer validity check timestamp, the new most recent buffer validity check timestamp reflecting a time when the comparing occurs.

16. A computer-implemented method as in claim 13, wherein the rebuilding further comprises accessing the original version of the constituent element stored in the repository.

17. A computer-implemented method as in claim 13, wherein the identifying occurs at runtime.

18. A computer-implemented method as in claim 17, wherein the operations further comprise identifying, on a subsequent runtime access of the buffer, that the buffer is up to date, the identifying that the buffer is up to date comprising determining that the new most recent buffer validity check timestamp is more recent than the most recent lifecycle management event timestamp for the buffer.

19. A computer-implemented method as in claim 13, wherein at least one of the identifying, the maintaining, the comparing, and the rebuilding is performed by at least one programmable processor.

\* \* \* \* \*